(12) United States Patent
Brown et al.

(10) Patent No.: US 7,212,678 B2
(45) Date of Patent: May 1, 2007

(54) IMAGE TRANSFER OPTIMISATION

(75) Inventors: Craig Matthew Brown, Carlingford (AU); James Philip Andrew, Waverton (AU); Patrice Jean Paul Onno, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 691 days.

(21) Appl. No.: 09/983,560

(22) Filed: Oct. 25, 2001

(65) Prior Publication Data

US 2002/0051583 A1 May 2, 2002

(30) Foreign Application Priority Data

Oct. 30, 2000 (AU) ..................... PR1104

(51) Int. Cl.
*G06K 9/36* (2006.01)
(52) U.S. Cl. ..................................... 382/240
(58) Field of Classification Search ............... 382/232, 382/240, 248, 251
See application file for complete search history.

(56) References Cited

U.S. PATENT DOCUMENTS

| | | | | |
|---|---|---|---|---|
| 6,137,914 | A | 10/2000 | Ligtenberg et al. | 382/240 |
| 6,246,798 | B1 | 6/2001 | Andrew et al. | 382/240 |
| 6,259,819 | B1 | 7/2001 | Andrew et al. | 382/248 |
| 6,263,110 | B1 | 7/2001 | Andrew et al. | 382/232 |
| 6,266,414 | B1 | 7/2001 | Bradley et al. | 380/240 |
| 6,314,452 | B1 * | 11/2001 | Dekel et al. | 709/203 |
| 6,545,687 | B2 | 4/2003 | Scott et al. | 345/629 |
| 6,711,297 | B1 * | 3/2004 | Chang et al. | 382/240 |

FOREIGN PATENT DOCUMENTS

| | | |
|---|---|---|
| EP | 0 859 335 A2 | 8/1998 |
| EP | 0859335 A2 | 8/1998 |
| EP | 0 859 335 A1 | 7/2004 |
| WO | WO 01/69911 A2 | 9/2001 |

OTHER PUBLICATIONS www.cis.udel.edu/@amer/CISC651/JPEG2000_draft_std_cd154-44-1.pdf, "Information Technology—JPEG 2000 Image Coding System", JPEG 2000 Committee Draft Version 1.0, pp. x-xii and 1-164, Dec. 9, 1999.

* cited by examiner

*Primary Examiner*—Jingge Wu
*Assistant Examiner*—Tom Y. Lu
(74) *Attorney, Agent, or Firm*—Fitzpatrick, Cella, Harper & Scinto

(57) ABSTRACT

A method of retrieving an image for display is disclosed. The image is stored in a compressed wavelet-based format having blocks encoded substantially independently. Initially, a representation (1300) of the image is provided at a first (low) resolution (1302). The user can then select a portion (1308) of the representation for reproduction at a predetermined, generally a second (higher), resolution. A first set of blocks is then identified (1322) corresponding to the selected portion(1310), which are then retrieved, decompressed and rendered to display. A second set of blocks (associated with the first set of blocks) is then identified (1326–1340), retrieved and decompressed. The rendered first set of blocks is then modified using the decompressed second set and displayed at the predetermined/second resolution.

19 Claims, 10 Drawing Sheets

IMAGE TRANSFER OPTIMISATION

FIELD OF THE INVENTION

The present invention relates to the display of compressed images and, in particular, to optimising the process of compressed image retrieval and display.

BACKGROUND

The transmission of information from one point to another is usually performed at an expense related to the volume of information being transported, as well as to the distance over which the information must be carried. With pages of information that are formed of mixed text and images, the images can often contain one to two orders of magnitude more data than the text, and thus can significantly influence the creation of substantial bottlenecks in transmission.

With an ever increasing bandwidth in file transfers, whether it be in relation to the Internet, other computer connections such as wireless and local transfer or even within a computer, the bottleneck referred to above is often reduced. However, one problem that seems to pervade the developing computer industry in that increases in bandwidth are often quickly matched by increases in file size, thereby never effectively addressing the problem identified above.

Improving image compression schemes have assisted in reducing the size of images being transferred. However, the decrease in file size is typically minimal. For example, a JPEG 2000 image is at most 30% smaller than a traditional JPEG image, the latter representing fifteen years older technology.

SUMMARY OF THE INVENTION

It is an object of the present invention to substantially overcome, or at least ameliorate, one or more deficiencies or problems associated with existing arrangements.

In accordance with one aspect of the present disclosure there is provided a method of retrieving an image for display, the image being stored in a compressed wavelet-based format having blocks encoded substantially independently, said method comprising the steps of:

selecting a portion of said image for reproduction at a predetermined resolution;

identifying a first set of said blocks corresponding to said selected portion;

retrieving said first set of blocks, decompressing and rendering same to display;

identifying a second set of blocks associated with said first set of blocks;

retrieving said second set of blocks and decompressing the same; and modifying said rendered first set using the decompressed second set and displaying the modified selected portion at said predetermined resolution.

In accordance with another aspect of the present disclosure there is provided a method of retrieving an image for display, the image being stored in a compressed wavelet-based format having blocks encoded substantially independently, said method comprising the steps of:

(a) providing a representation of said image at a first (low) resolution;

(b) selecting a portion of said representation for reproduction at a second (higher) resolution;

(c) identifying a first set of blocks corresponding to said selected portion;

(d) retrieving, decompressing and rendering said first set of blocks to display;

(e) identifying a second set of blocks surrounding said first set of blocks;

(f) retrieving and decompressing said second set of blocks;

(g) modifying said display of the selected portion at said second resolution in accordance with both the first and second sets of blocks.

Preferably steps (d) and (e) occur substantially simultaneously.

Advantageously step (d) comprises, for peripheral pixels in said first set of blocks for which high frequency components required for representation at said second resolution are unavailable, setting said high frequency components to a predetermined value and rendering those said pixels at an intermediate resolution between said first resolution and said second resolution. The predetermined value is preferably zero.

Preferably step (g) comprises modifying said peripheral pixels.

Advantageously said retrieval of said blocks occurs over a computer network.

Apparatus and computer readable media for performing the methods are also disclosed.

BRIEF DESCRIPTION OF THE DRAWINGS

At least one embodiment of the present invention will now be described with reference to the drawings, in which.

DETAILED DESCRIPTION INCLUDING BEST MODE

Wavelet based image compression schemes are known in the art and utilise a division of the image to be compressed into blocks, and then the processing of the blocks to ultimately obtain image compression. An example of wavelet compression is the emerging JPEG 2000 standard, a draft of which has been published and entitled *"Information Tech-* nology—*JPEG 2000 Image Coding System—JPEG 2000 Committee Draft Version 1.0*, 9 Dec. 1999" hereinafter "JPEG 2000"

In JPEG 2000, the whole image is divided into one or more image tile components, each of which is then subject to a 2D discrete wavelet transform. The transform coefficients of each image tile component are then grouped together into sub-bands. The sub-bands are further partitioned into rectangular code blocks before each code block is then entropy encoded. The transform coefficients of each code block are expressed in a sign magnitude representation prior to entropy encoding.

Figure 1:
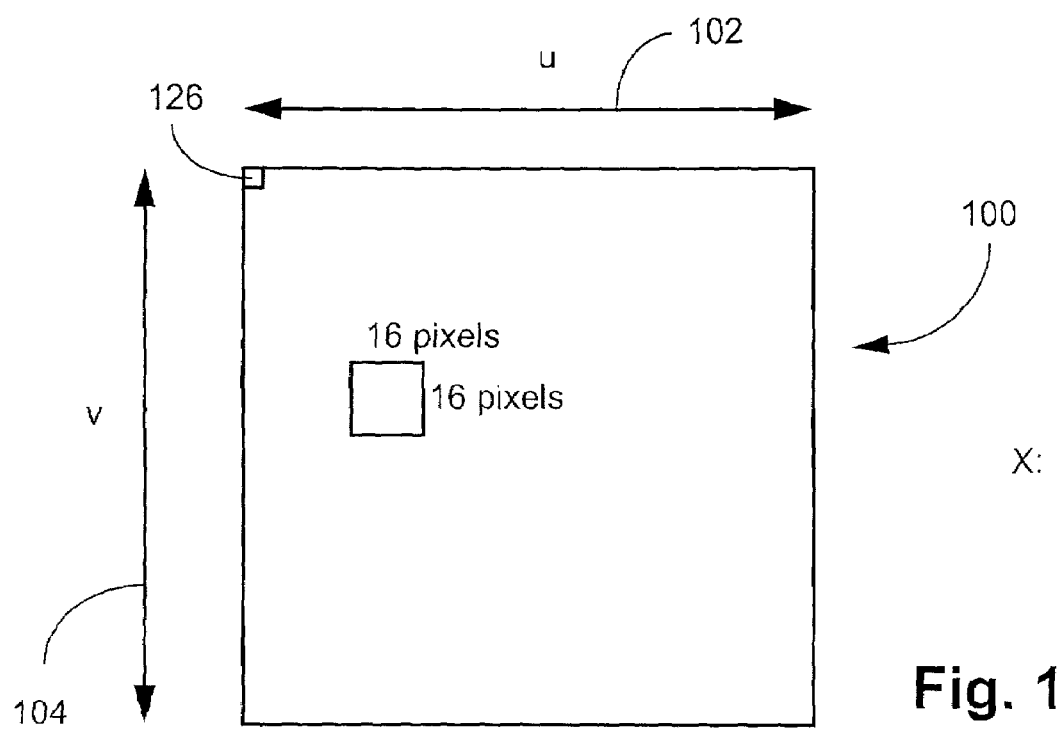
FIG. 1 represents an image the subject of compression.
Figure 2:
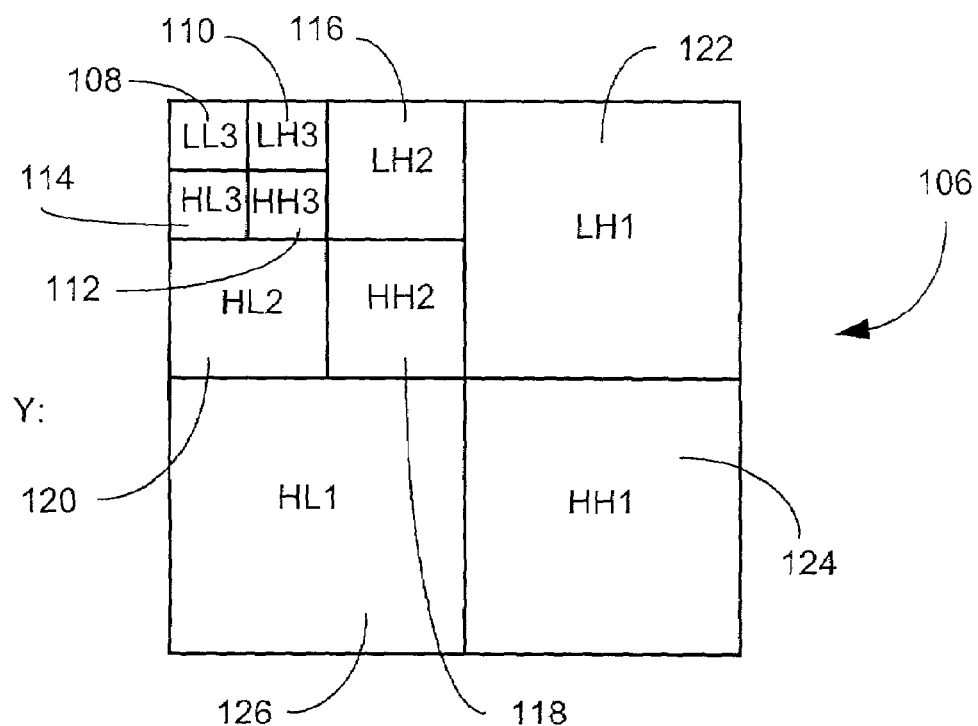
FIG. 2 is a schematic representation of a wavelet-based compressed image

FIGS. 1 and 2 illustrate the optimisation for the case of two-dimensional data, this being common in the field of image processing. Due to physical constraints of image output devices, output processing (i.e. Decompression/inverse transformation) in raster-order is often desired. In FIG. 1, a two-dimensional data set 100 with a width 102 (i.e. "u") and a height 104 (i.e. "v") undergoes wavelet transformation to provide an encoded form 106 of FIG. 2. The transformed data set 106 comprises a DC or lowest resolution sub-band 108 (i.e. LL3), a next-higher resolution band comprising three blocks 110, 112 and 114 (ie. LH3, HH3 and HL3 respectively), yet higher resolution sub-bands 116, 118 and 120 (ie. LH2, HH2 and HL2 respectively), and finally the highest resolution sub-bands 122, 124 and 126 (ie. LH1, HH1 and HL1 respectively). FIG. 2 is exemplary of a 3-level discrete wavelet transform (DWT). Any number of levels may be used according to the desired application.

Figure 3:
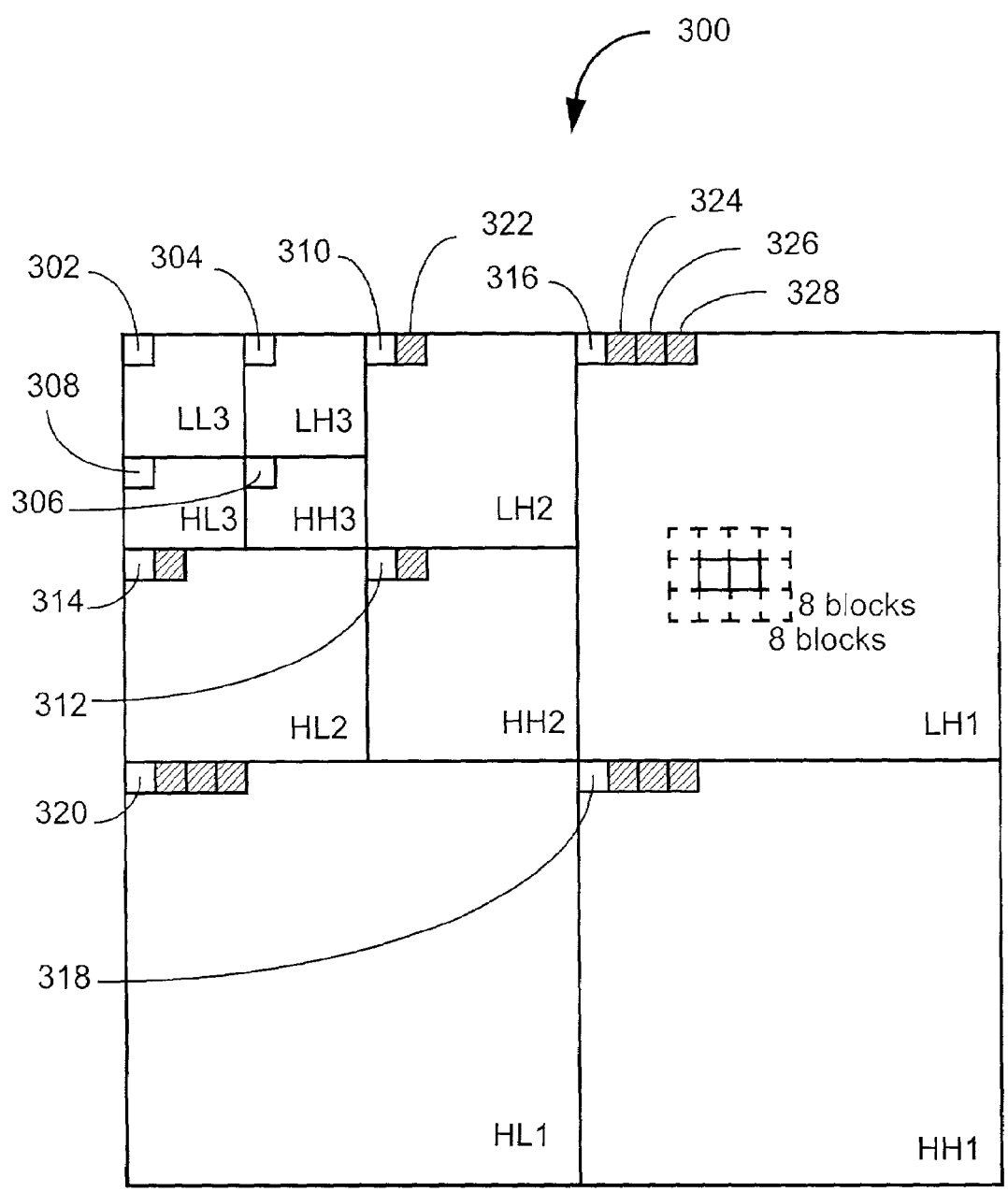
FIG. 3 depicts the relationship of coded data to resolutions available for decoding.

Referring to FIG. 3, with a block-based wavelet transform coding scheme such as JPEG 2000, the scheme results in the generation of data provided at a number of resolutions of the image that has been compressed and which may be randomly accessed according to the draft standard. In particular, the individual blocks of the image are transformed into various resolutions of data which, in FIG. 3, extends from the lowest frequency data in the upper left hand corner (LL3) to the highest frequency data in the lower right corner (HH1). Within each of the data groups, pixel representations are retained, these representing the levels of high frequency detail associated with each particular resolution at which image compression is performed. From the arrangement of FIG. 3, it will be apparent that four separate resolutions are available for reproduction with the lowest resolution (thumbnail) being level 0 and comprising the LL3 sub-band. The next resolution LL2 is formed from LL3, LH3, HL3 and HH3. The next resolution LL1 is formed from LL2, LH2, HL2 and HH2. The highest resolution LL0 (ie. the full image) is formed from LL1, LH1, HL1 and HH1.

Figure 12A:
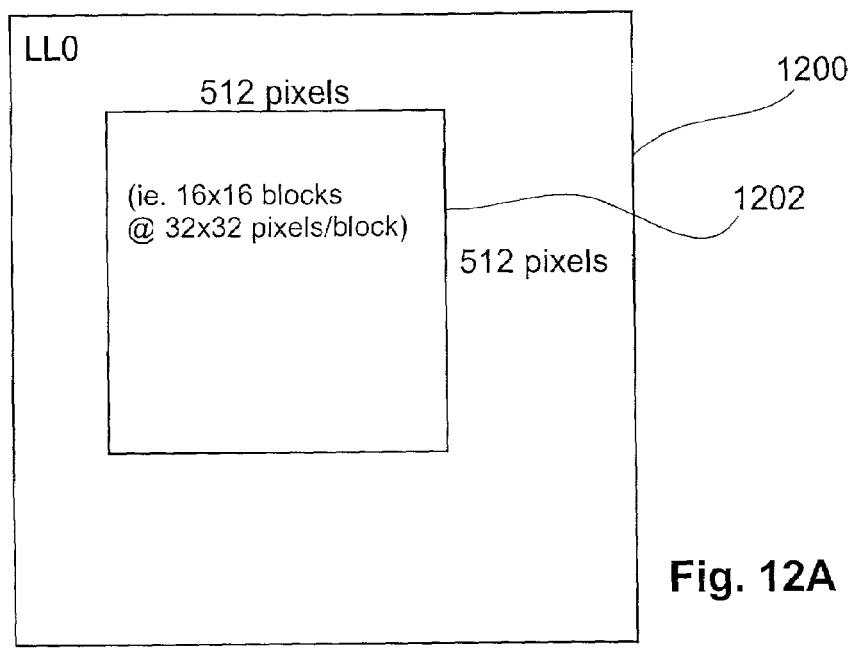
FIGS. 12A to 12E illustrate the change in block size for various resolutions of a region of an image.
Figure 12B:
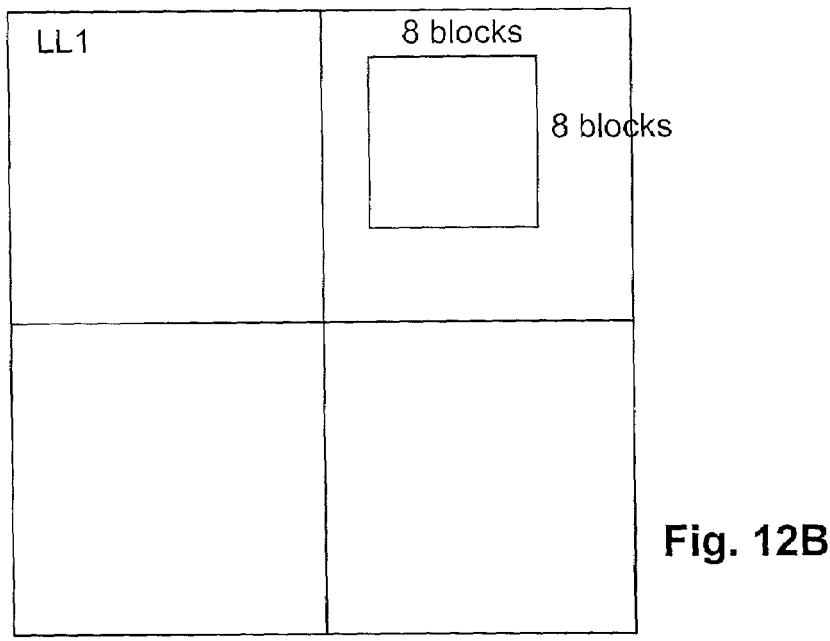
Figure 12C:
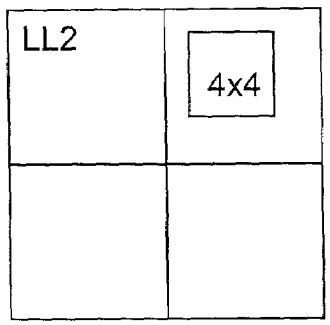
Figure 12D:
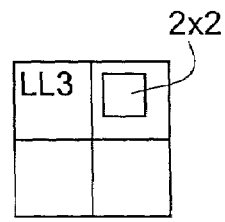
Figure 12E:
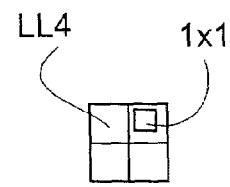

With reference to FIGS. 12A to 12E, in order to reconstruct a 512×512 pixel region 1202 of an original (LL0) image 1200 as shown in FIG. 12A, requires spatially corresponding blocks from each of the encoded resolutions. In JPEG 2000, blocks having 32×32 (ie. 1024) pixels or pixel coefficients are exemplary depending upon the particular resolution being processed at the time. Accordingly, the region 1202 of the image 1200 of FIG. 12A can be interpreted as having 16×16 blocks. As such, the LH1, HL1, HH1, and LL1 resolution depicted in FIG. 12B of the will have the same region represented by 8×8 blocks. The same approach applies for lower resolutions, depicted in FIGS. 12C, 12D and 12E. However, this will generally only give an approximate reconstruction. The filter overlap of most wavelet filters (excluding the Haar filter) necessitates the processing of extra pixel coefficients on each sub-band. For the 9/7 JPEG 2000 filter and a transition of a single level, this requires up to 2 pixels coefficients surrounding the entire region. In order to obtain those extra 2 coefficients, the entire block containing those coefficients must be obtained, since according to the JPEG 2000 standard, blocks are the lowest addressable components of the image at any resolution. Thus, for the example in FIG. 12B, such requires 10×10 blocks (ie. (1+8+1)×(1+8+1)) in the level 1 sub-band. This correspondence similarly maps into higher levels. For example, the 8×8 block on the LL1 sub-band will map into 4×4 blocks at level 2, requiring 6×6 blocks to handle filter overlap. Sometimes one extra edge pixel may be sufficient, as is the case for example with the 5/3 JPEG 2000 filter. At a pixel level, this matter may be summarised as follows:

L0: 512×512 pixels (16 blocks (32×32 pixels))
L1: (2+512/2+2)×(2+512/2+2)=260×260 pixels: 1+8+1 blocks (32×32 pixels)
L2: (2+260/2+2)×(2+260/2+2)=134×134 pixels: 1+4+1 blocks (32×32 pixels)
L3: (2+134/2+2)×(2+134/2+2)=71×71 pixels: 1+2+1 blocks (32×32 pixels)
L4: (2+134/2+2)×(2+134/2+2)=40×40 pixels: 1+1+1 blocks (32×32 pixels)

It is to be noted that by the L4 level, it is necessary to obtain 4 pixels from the surrounding blocks due to the accumulation of extra pixels at each level . . . .

The specific image transfer optimisation arrangement disclosed herein makes use of the feature of such coding arrangement that requires spatially related compressed blocks to reproduce as one determinable part of the desired image.

In view of the spatial correspondence between blocks in the wavelet domain and the corresponding regions in the output resolution, individual portions of an encoded image may be selectively reproduced by decoding only those necessary blocks. However, decoding portions of the output resolution may require, depending upon the particular wavelet filter being used, significantly more compressed wavelet information than the one-to-one spatial correspondence would suggest. The present inventors have determined that by managing the manner in which specific blocks are delivered for reproduction, optimisations in image transfer can be obtained to provide for optimised speed of reproduction before the user as a function of time for delivery of the desired resolution.

The transfer optimisation method to be described with reference to FIGS. 4 to 6 and others is preferably practiced using a general-purpose computer system 700, such as that shown in FIG. 7 wherein the processes of FIGS. 4 to 6 may be implemented as software, such as an application program executing within the computer system 700. In particular, the steps of method of transfer and decompression are effected by instructions in the software that are carried out by the computer. The software may be divided into two separate parts; one part for carrying out the transfer and decompression methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for image transfer and decompression.

The computer system 700 comprises a computer module 701, input devices such as a keyboard 702 and mouse 703, and output devices including a printer 715 and a display device 714. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN). As seen, the network 720 provides for an interconnection between the computer system 720 and a server computer 750 which has a memory store 752 of one or more images desired to be retrieved.

The computer module 701 typically includes at least one processor unit 705, a memory unit 706, for example formed from semiconductor random access memory (RAM) and read only memory (ROM), input/output (I/O) interfaces including a video interface 707, and an I/O interface 713 for the keyboard 702 and mouse 703 and optionally a joystick (not illustrated), and an interface 708 for the modem 716. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the described arrangements can be practised include IBM-PC's and compatibles, Sun Sparcstations or alike computer systems evolved therefrom.

Figure 8:
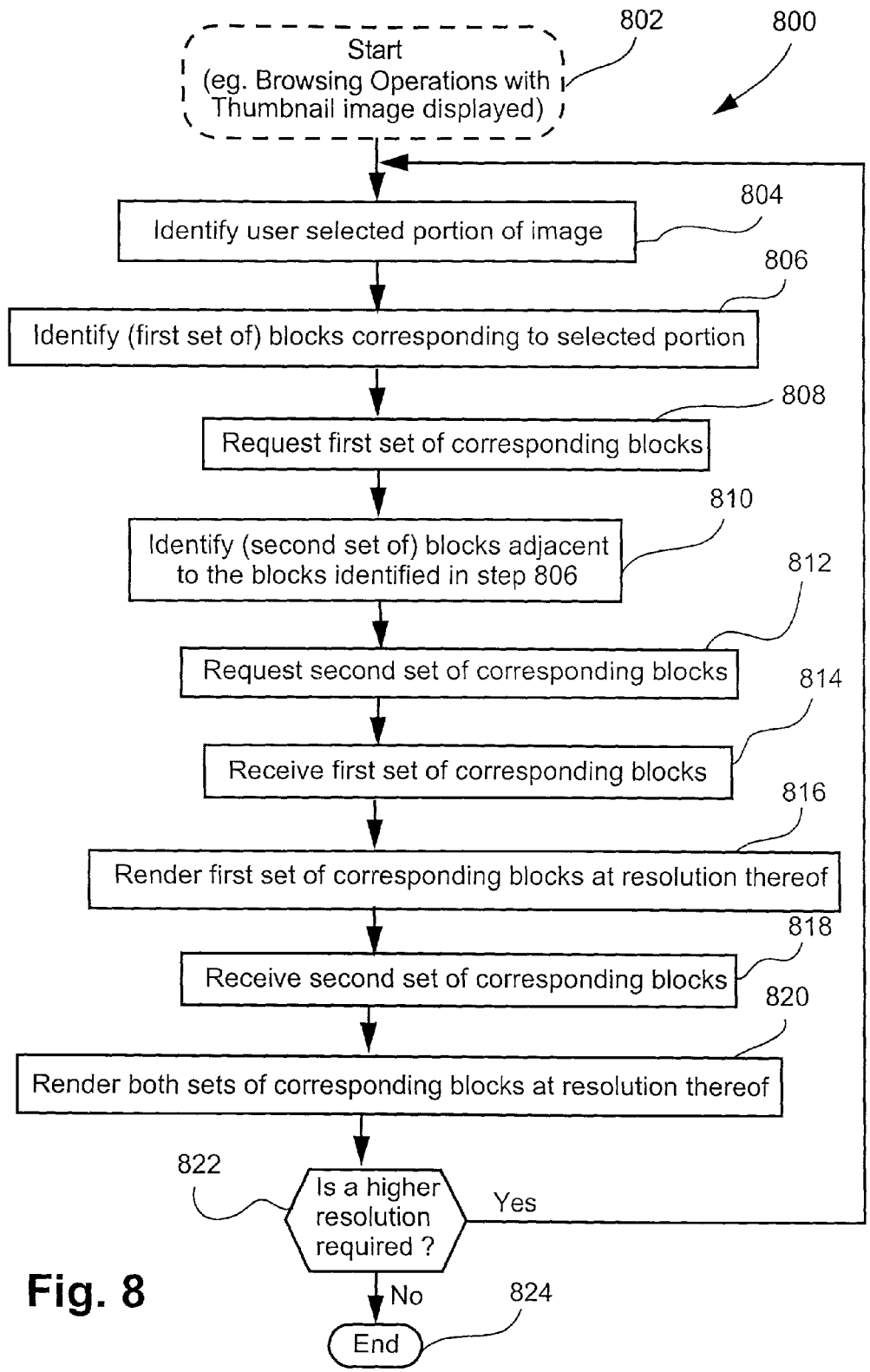
FIG. 8 is a flowchart of the method of calling and displaying an image.
Figure 9:
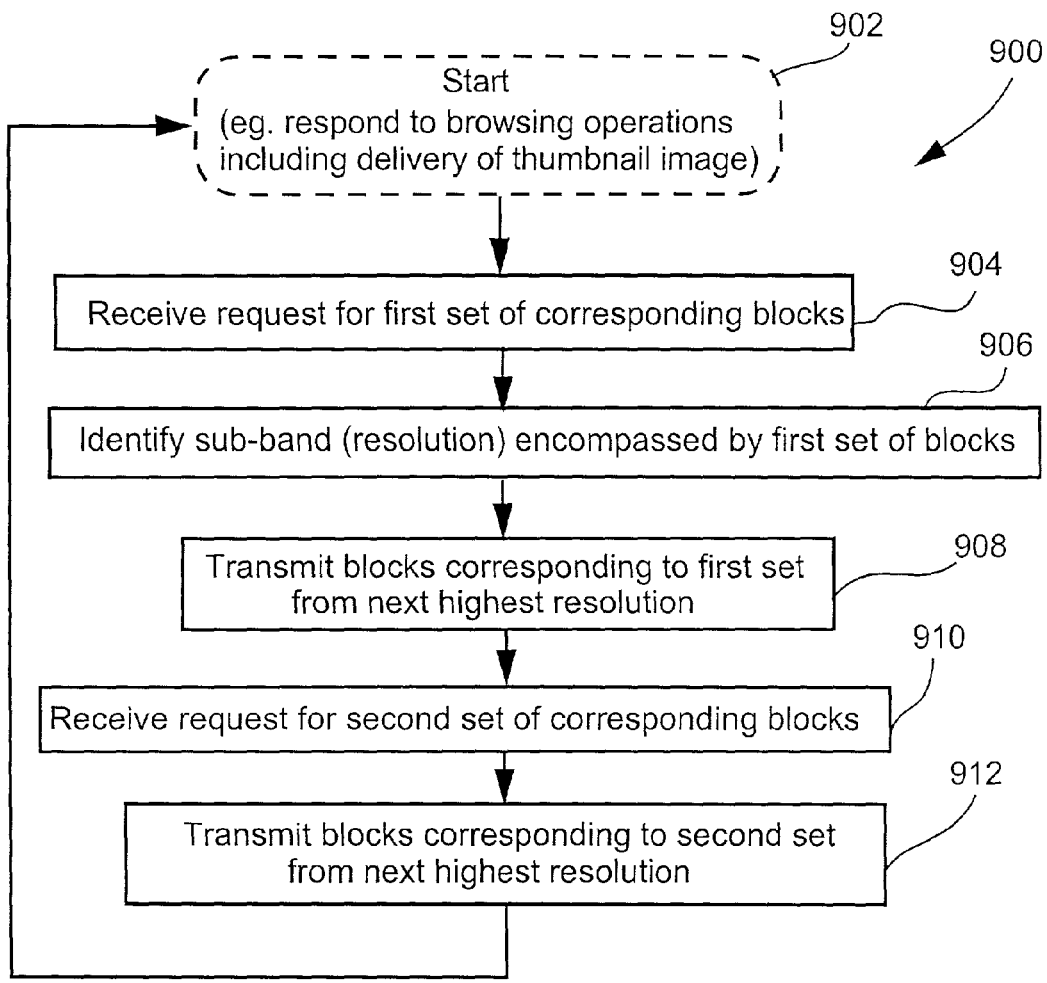
FIG. 9 is a flowchart of the delivery of image blocks.

Typically, the application program is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable medium including magnetic tape, a ROM or integrated circuit, a magneto-optical disk, a radio or infra-red transmission channel between the computer module 701 and another device, a computer readable card such as a PCMCIA card, and the Internet and Intranets including e-mail transmissions and information recorded on websites and the like. The foregoing is merely exemplary of relevant computer readable media. Other computer readable media may alternately be used. FIG. 8 depicts, in flow diagram form, the method steps 800 of the application program operating in the computer module 701 to facilitate image transfer optimisation and display. FIG. 9 depicts complementary method steps 900 that may be performed by the server computer 750 when the computer module 701 running the application of FIG. 8 makes a request for an image retained in the store 752. It will be appreciated that the server computer 750 may have a structure similar to that of the computer module 701.

The method of transfer optimisation and decompression may alternatively be implemented in whole or part by dedicated hardware such as one or more integrated circuits performing the functions or sub functions of transfer optimisation and decompression. Such dedicated hardware may include graphic processors, digital signal processors, or one or more microprocessors and associated memories.

Figure 4:
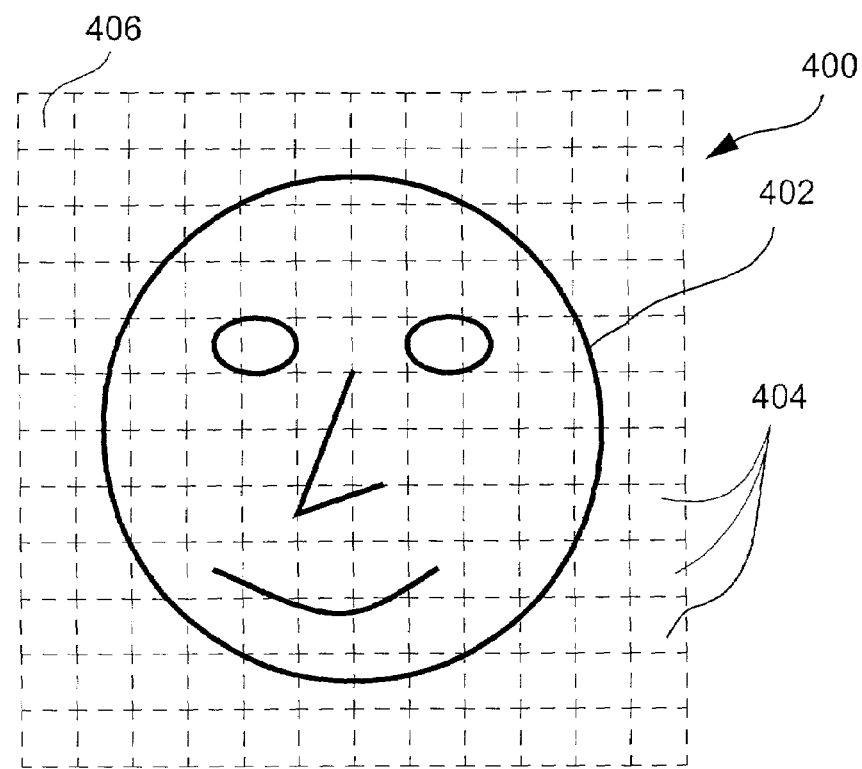
FIG. 4 shows an exemplary image.

Turning to FIG. 4, an image 400 comprising a face 402 is shown, in which a grid 404 is used to represent the 12×12 block structure in the wavelet domain. For example, the top left block in each of the level 1 sub-bands corresponds to the top left block 406 in FIG. 4. Typically, for example when the computer module 701 is operating a browser application for conducting browsing operations of the computer network 720, the image 400 may be retrieved from a database retained in the store 752 at which a web-site may be resident. Typically, on a first call to a particular web page, the web page will supply with a low resolution thumbnail representation that forms the image 400, for example corresponding to the DC or low frequency data (LL3) of FIGS. 2 and 3. The image 400 would ordinarily be displayed to the user operating the computer system 700 upon the display 714, such being represented via the steps 802 and 902 of FIGS. 8 and 9 respectively. The transfer requirements of such a low resolution image are minimal in view small amount of DC (low frequency) information required for the reproduction of the thumbnail image.

Traditionally, if the user desired a higher resolution version of the thumbnail image 400, the user could click on the image 400 as displayed using the mouse 703 to cause the browser application to request from the web site at the server 750 the higher resolution version, at which time the entirety of the higher resolution version image would be supplied via the network 720 for reproduction on the display device 714. Such traditionally requires transmission of all encoded blocks in order for the user to view the next higher resolution.

Figure 5:
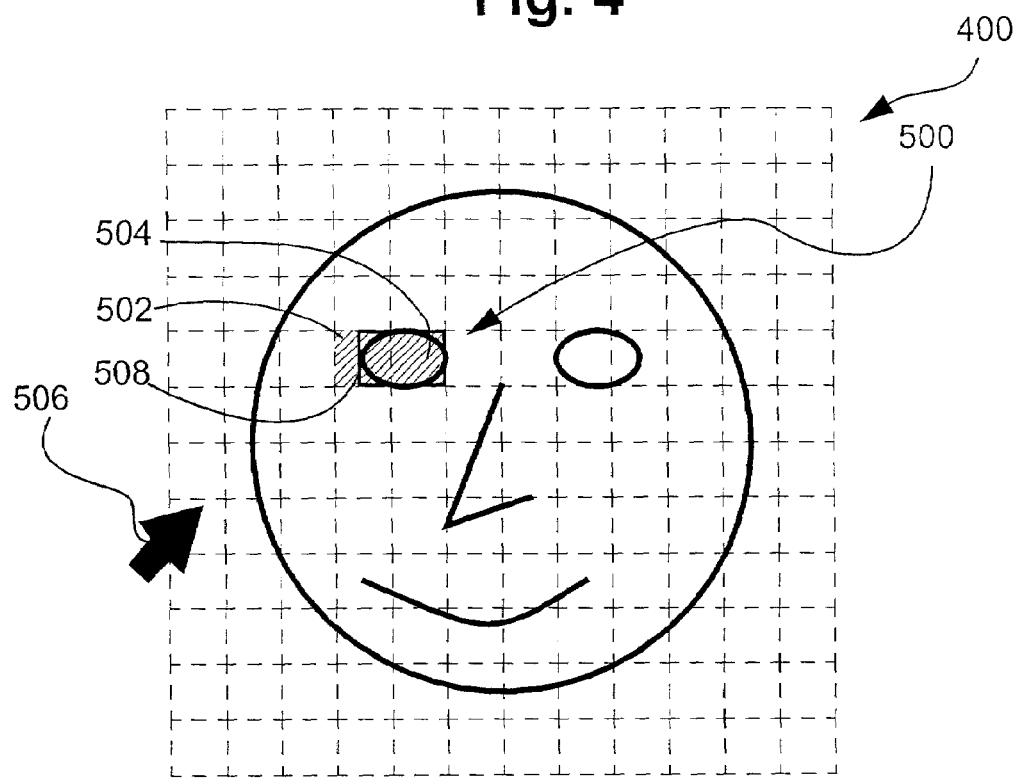
FIG. 5 shows those blocks associated with a portion of the image of FIG. 4 for which a higher resolution representation is desired.

However, according to the present disclosure, and with reference to the example of FIG. 5, where the user viewing the image 400 requires to view only the detail of the right eye of the face 402, a selection is made by the user whereby those blocks that are selected form the basis of the request for corresponding blocks of the higher resolution image. As a consequence, only those portions of the higher resolution image that are desired by the user are transmitted, thereby optimising display throughput (ie. how quickly the user sees what is desired to be seen) and channel bandwidth. A set of blocks 500 shaded in FIG. 5 as incorporating the right eye, at least, must be further decoded to a high level resolution. As illustrated, the right eye falls entirely within but against the edge of two blocks 502 and 504, which collectively form the set 500.

Figure 11:
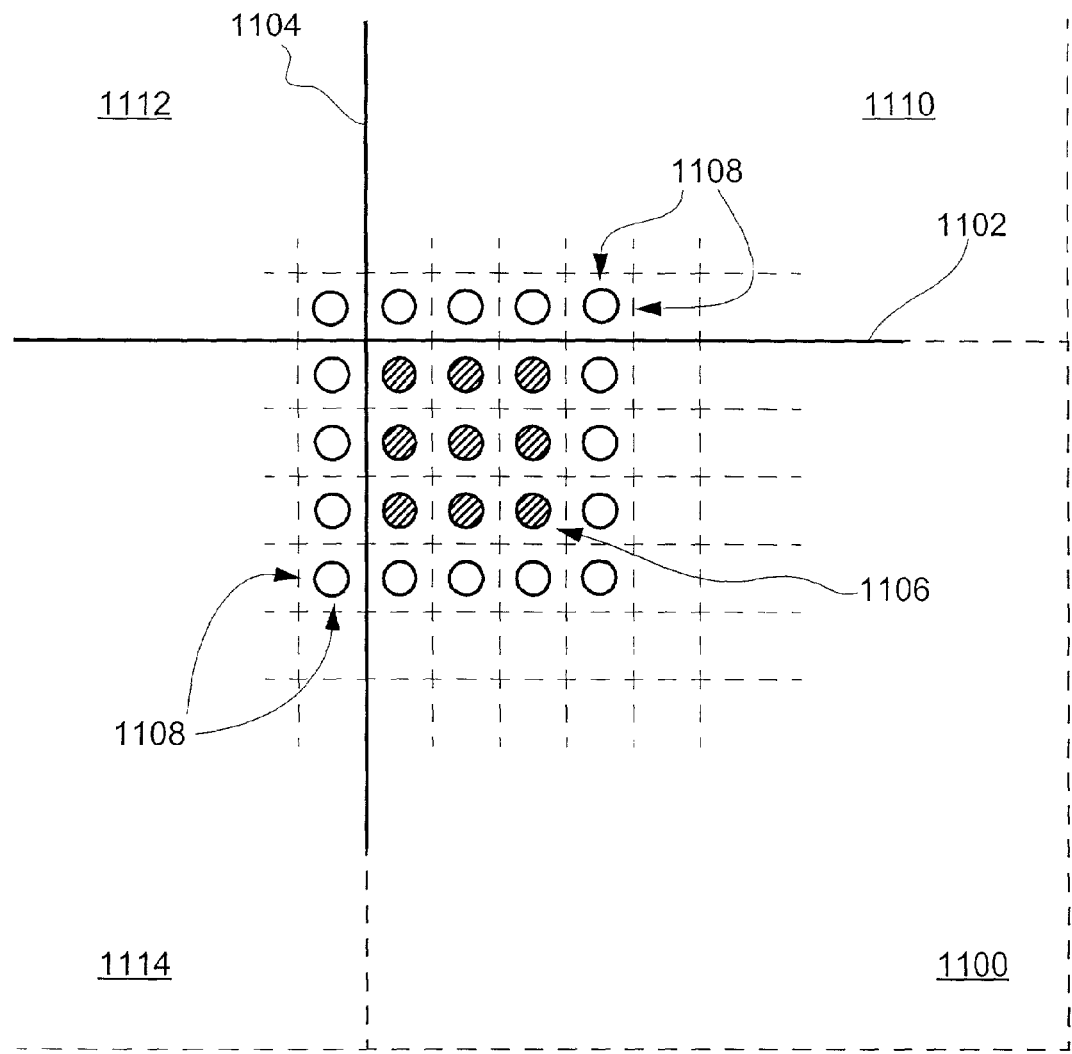
FIG. 11 depicts the operation of the 5/3 JPEG 2000 filter at the corner of a block.

Further, according to the wavelet transform arrangements described above, in addition to those blocks shaded in FIG. 5 incorporating the features of the eye, blocks adjacent (ie. above, below and beside, and diagonally adjacent) to the shaded blocks should also be decompressed as those adjacent blocks contain pixels which will influence pixels within the blocks that incorporate the eye. This point is explained best with reference to FIG. 11 which shows a representation of a comer of a block 1100 defined by virtual boundaries 1102 and 1104. Shown are a number of pixel values (ie. wavelet coefficients) encoded according to the 5/3 JPEG 2000 filter. According this standard, 5 coefficients are necessary to reproduce any 3 pixel coefficient values, the later which may represent coefficients for the next resolution. As such, in order to accurately reproduce the 9 pixel coefficient values 1106 in the comer of the block 1100, adjacent pixel coefficient values 1108 are required. Significantly this includes pixel coefficient values from, in this case, three adjacent blocks 1110, 1112 and 1114.

According to the preferred arrangement, at least two sets of blocks are identified in order to reproduce the desired resolution of the image. The first set of blocks comprises those that spatially correspond to the area desired to be seen by the user (ie. the set of blocks 500 of FIG. 5). The user marks that portion (ie. the blocks 502 and 504) of the image 400 as being that required in detail. Depending upon the extent of the portion to be viewed in detail, a number of approaches may be used. For example where the user only wishes to identify a single point as the focus of the higher resolution zoom, the user may manipulate a pointer 506 associated with the mouse 703 in the browser display to click on the image 400 at the desired location to identify a specific one of the displayed blocks. Alternatively, where a region is desired, the user may use the mouse 703 to scribe a bounding box 508 around the desired portion, thereby identifying a group of blocks that intersect with the bounding box 508.

As seen in step 804, the application identifies from the user's marking, the selected portion of the image 400 this being, in effect, a mapping to the display coordinates traced or specified by the mouse pointer 506. The JPEG 2000 standard provides that parts of an encoded file may be randomly located without a need to traverse the entire file. Using this property, step 806 operates to interpret the selected portion to identify those particular displayed blocks of the encoded file that correspond. Those blocks may be considered as the first set of blocks 500. Where a mouse click is used, the set will comprise only one block, however in the present example the set comprises the blocks 502 and 504.

With step 808, the application then sends a request to the server 750 for the next resolution corresponding to the first set of blocks 500.

Figure 6:
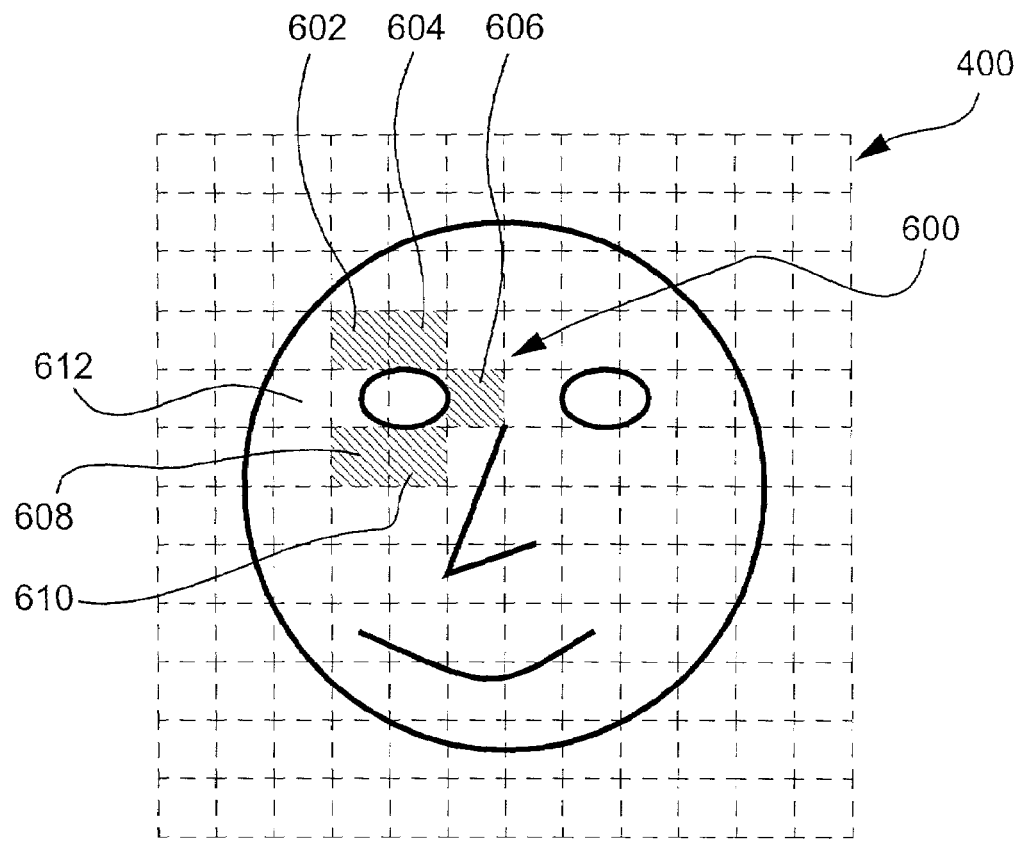
FIG. 6 shows surrounding blocks that influence the higher resolution representation of the blocks of FIG. 5.
Figure 7:
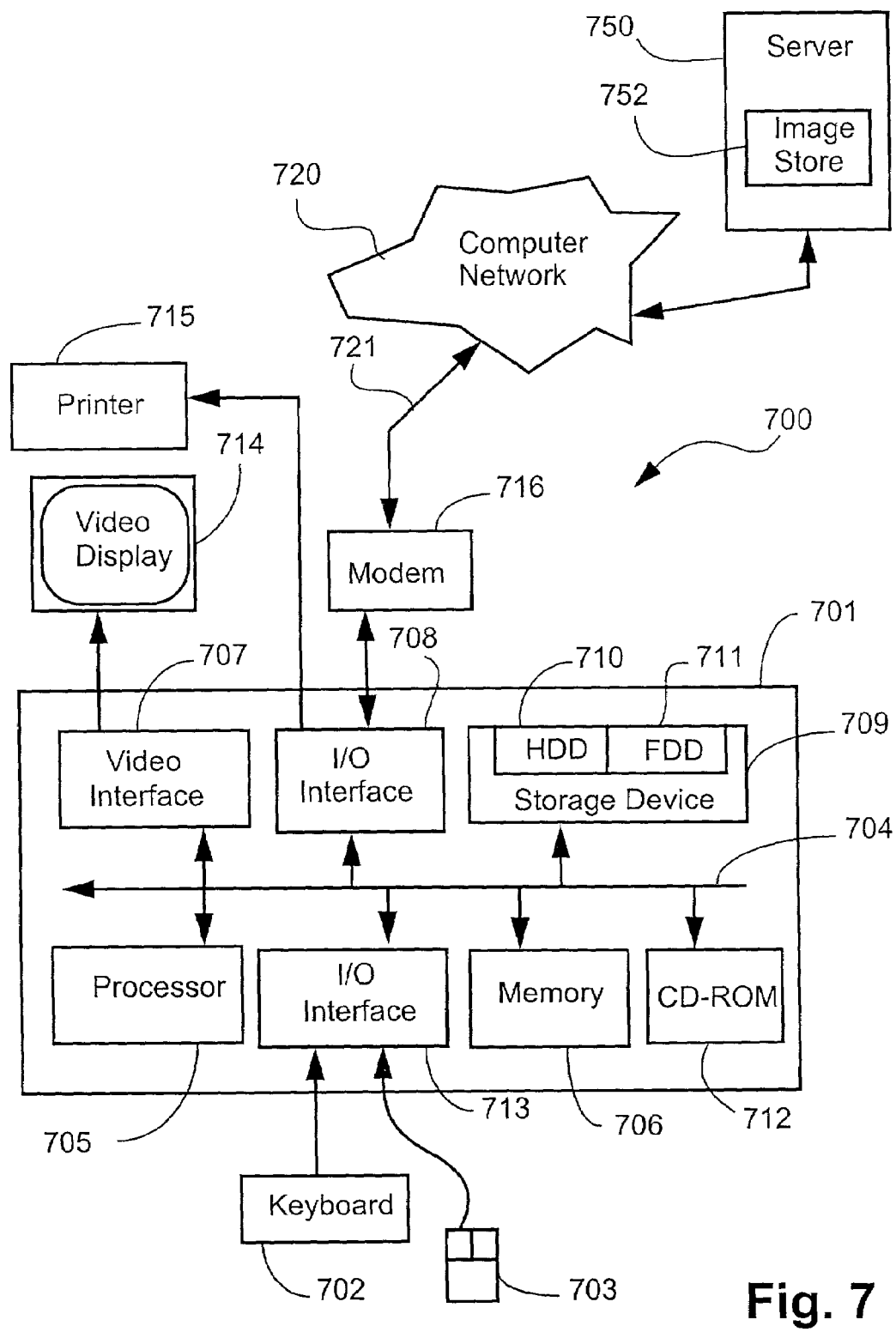
FIG. 7 is a schematic block diagram representation of a computer system upon which the described arrangements may be performed.

At step 810, the application then operates to identify a second set of blocks 600, which includes the blocks 602–610 as seen shaded in FIG. 6, that surround the first set of blocks 500 and which contain coefficients that contribute, via the filter overlap described above and with reference to the example of FIG. 11, to the pixels within the first set of blocks 500. Where only a single block is selected by a mouse click, the four blocks surrounding the selected block become the second set. In the present example, the bounding box 508 encompasses the entirety of the block 504 and extends approximately half way across the block 502 to thereby envelope the eye. Therefore those blocks that touch upon the bounding box 508 are required, these being the blocks 602–610, but not the block 612 since the bounding box 508 terminated well inside the block 502 and therefore the adjacent pixel/coefficient values for the user desired portion would reside within the block 502. In this fashion, image transfer may be optimised by firstly requesting only those blocks 500 in the first set, followed by making a request, at step 812, for those blocks 600 comprising the second set.

Figure 10:
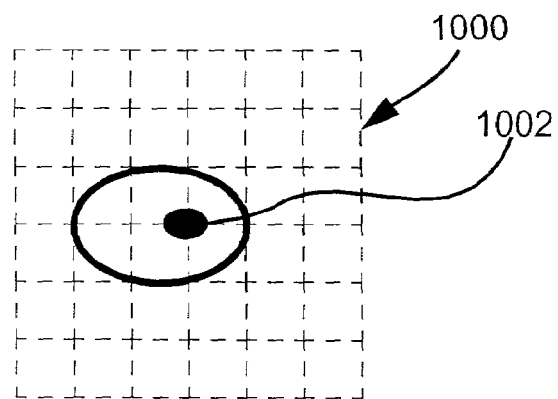
FIG. 10 shows the result of the transfer optimisation of the images of FIGS. 4 to 6.

Typically, steps 810 and 812 may be performed by the computer module 701 during the communications latency of the network 720 subject to the request at step 808. As such, after step 812, step 814 awaits receipt of blocks corresponding to the first set 500 but at the next highest resolution. On receipt, such corresponding blocks may be retained in the memory 706 of the computer module 706 for display using the browsing application. This has the effect of initially enabling the rendering at step 816 of the received blocks corresponding to the first set 500, providing a higher resolution of the selected portion of the image to the user. This can occur whilst the remaining blocks, corresponding to the second set 600, are retrieved and received at step 818. Once the blocks 600 are received and stored in the memory 706, the entire desired portion of the image (ie. the eye) may be re-rendered at the desired resolution before the user, this being performed at step 820, the results of which are seen as a higher resolution image 1000 of the eye in FIG. 10. As seen, the image 1000 is formed by 36(=6×6) blocks, thereby affording a substantial communications and time saving compared to the traditional approach which would have required 576 blocks to be transmitted to give the same resolution of the eye, assuming each block at the initial resolution transformed to 4 blocks at the next highest resolution.

Where desired or available, the user may, after step 820, desire to view an even higher resolution, this being depicted at step 822. Where such a feature is desired, the application can return to step 804 to await identification of that further feature of he eye by the user (eg. the pupil 1002 of the eye seen in FIG. 10).

Referring to FIG. 9, the server 750 at step 904 receives the request relating to the first set of blocks 500. At step 906, the server 750 interprets the set 500 and the various resolutions retained in the store 752 to identify those blocks that correspond to the blocks 500, at the next highest resolution. This again may be performed according to established protocols within the JPEG 2000 standard. Those corresponding blocks are then transmitted at step 908 by the server 750 to the computer module 701. At step 910, which is seen to follow step 908 typically due to communications latency, the request relating to the second set 600 is received by the server 750. At step 712, since the required resolution is known from step 906 (ie. the correct sub-band), the server 750 can then readily access the corresponding blocks at the required resolution related to the set 600, such being transmitted to the computer module 701.

The pixels not specifically desired to be seen (being those contained in the second set of blocks 600), whilst having an effect on the pixels that are desired to be viewed (those in the first set of blocks 500) only have a limited effect on the final representation. Assuming the DC blocks have already been retrieved, since the high frequency components as seen from FIGS. 2 and 3 are stored separately from the low frequency components, during rendering of the first set of blocks, the absent high frequency components may be assumed to be a preset value (for example, zero). This effectively gives rise to a rendering of the first set of blocks at a resolution intermediate the former resolution and the desired resolution. This is particularly the case in relation to the example of FIG. 11 where, when rendering the image corresponding to the coefficients 1106, the absent coefficients 1110 required by the 5/3 JPEG 2000 filter may be set to zero. Alternately, the absent coefficients may be set to the value of the corresponding adjacent coefficient. It follows therefore that when the second set of blocks 600 are retrieved, and their high frequency components decoded, the high frequency components of peripheral pixels may be used to modify the high frequency components of the blocks of the first set 500 so as to complete the rendering of the first set of blocks 500 at the desired higher resolution. As a consequence, the (re)rendering at step 820 may only have limited influence on the image 1000 and only about the periphery of the portion desired by the user (ie. the edges of the eye in the image 1000, as opposed to the edges of the image 1000). Where the user however selects to traverse a number of resolutions in a single step, the influence will be greater and possibly significant.

As a further extension, once the blocks at the higher resolution corresponding to the second set 600 are requested from the computer 701 or transmitted from the server 750, all remaining blocks of the higher resolution image may be automatically requested or automatically transmitted. Such may be done in a traditional raster fashion, or alternately in some priority order, for example centred upon the eye and expanding outwards to the periphery of the image 400. Such then enables the user to pan across or up and down the image once the detail of the eye is displayed. Such would typically occur within the transmission latency of a traditional image request.

Figure 13A:
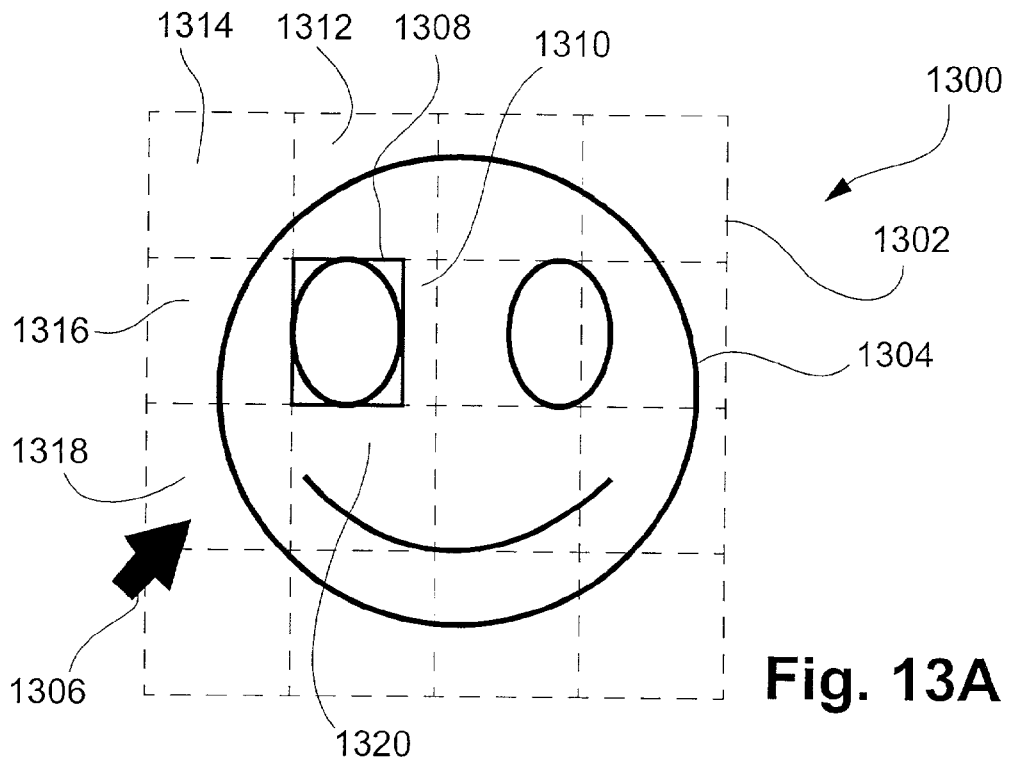
FIGS. 13A and 13B illustrate the priority ordering of requests for blocks.
Figure 13B:
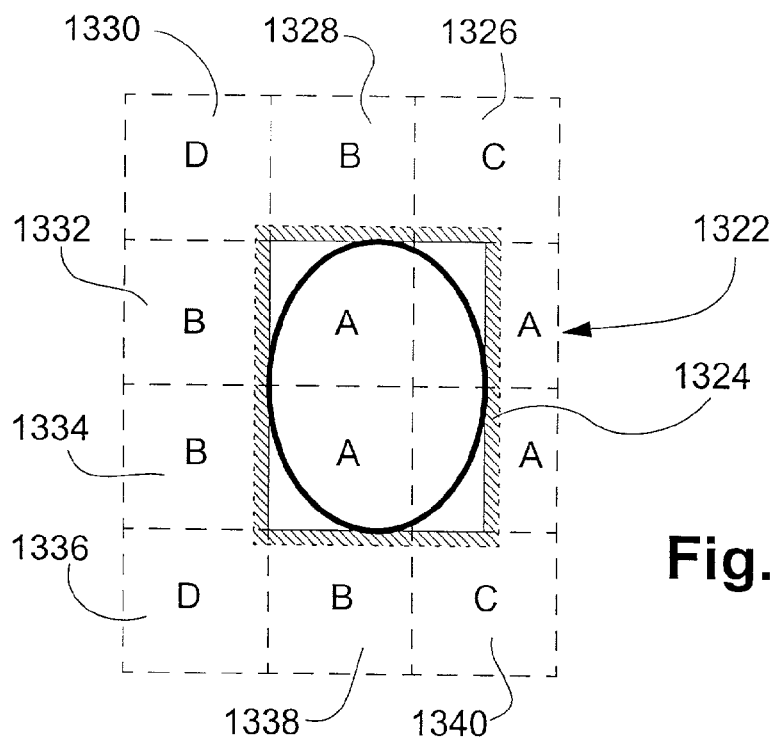

FIGS. 13A and 13B show a further example that implements ordering to the block requests. FIG. 13A shows part of an image 1300 in which a face 1304 is depicted within a 4×4 array of blocks. As with the previous examples, the user desires to view the next level detail of the right eye. With the cursor 1306 operated via the mouse 703, the user can scribes a bounding box 1308 neatly around the right eye. As seen in FIG. 13A, the right eye lies within a block 1310 but touches edges with adjacent blocks 1308, 1316 and 1320. The bounding box 1308 touches each of those blocks, as well as blocks 1314 and 1318. As such, the pixels within and on the edge of the bounding box 1308 define the blocks at the next resolution that are required to be retrieved for accurate reproduction of the right eye at that resolution.

This is seen in FIG. 13B, where the block 1310 is resolved into four blocks 1322 each labelled "A". The block 1312 resolves into four blocks of which only blocks 1326 and 1328 are illustrated. The block 1314 also resolves into four blocks of which only block 1330 is illustrated. Similarly, block 1316 resolves into four blocks of which only blocks 1332 and 1334 are illustrated, block 1318 resolves into four blocks of which only block 1336 is illustrated, and block 1320 resolves into four blocks of which only blocks 1338 and 1340 are illustrated. Because it is known from the JPEG 2000 standard which blocks in FIG. 13A will resolve to certain blocks in FIG. 13B, such can be used to priority order the block retrieval.

FIG. 13B shows a shaded region 1324 that represents those additional pixel coefficient values required to accurately reproduce the right eye according to the filter criteria being used. Notably, the right-side edge of the region 1324 lies within two of the blocks 1322 and thus that edge, in this example, does not define further blocks required for accurate reproduction. In this connection, the ordering approach of this implementation operates to count pixels within each block in FIG. 13A that intersects with the bounding box 1308. The block 1310 will have the greatest pixel count and form the first set of blocks, and are thus ranked "A" in priority order. The edges of the bounding box 1308 are then examined for intersection with adjacent blocks and the extent of intersection noted, again for example by counting pixels. As is seen from FIG. 13B, blocks 1328, 1332, 1334 and 1338 have full edges and can thus be ranked "B" in priority order. Blocks 1326 and 1340 have about half an edge intersection and are ranked "C" in priority order. Finally, blocks 1330 and 1336 only intersect at their corners and are given a lowest ranking "D".

Accordingly, in the example of FIGS. 13A and 13B, the blocks "A" 1322 would form the first set, and the blocks 1326–1340 would form the second set. However, the second set may be divided into priority calls for sub-sets, in order, being "B" blocks 1328, 1332, 1334 and 1338, "C" blocks 1326 and 1340, and lastly "D" blocks 1330 and 1336. By retrieving those blocks in that order, the image transfer is optimised in terms timely reproduction of the desired image. Notably, a separate network request to the server computer 750 may be made for each set and sub-set. Alternatively, the network request for the second set may specify the block requirements in the priority order of the sub-sets.

The described arrangement therefore provides for image transfer optimisation by firstly transferring those pixels or blocks that are desired to be seen, and to have the rendering device estimate those values of non-visible pixels, until such time as the non-visible pixels are retrieved and their decompression may be used to influence the visible pixels already displayed.

This method of transfer is in contrast to traditional wavelet-based block transfer where, once the desired area has been selected, retrieval occurs either in a traditional raster pattern of all blocks that contribute to the selected area, or by providing those blocks in the order in which they have been stored, which may not be optimised for the specific portion or area selected by the user.

In this fashion, according to the presently disclosed arrangements, whilst the rendering of the image does not immediately produce the desired resolution, it provides an improved resolution to that originally presented whilst at the same time optimising the delivery of data to aid decompression and therefore user interpretation of the image whilst the image is "built" to the desired resolution. Qualitatively, the presently disclosed arrangements provide for the user to be presented with the target image in, say, 1 second, which may be "cleaned-up" over the next 1 second, whereas traditional arrangements may require 5–10 seconds for the user to be presented with the entire higher resolution image.

INDUSTRIAL APPLICABILITY

It is apparent from the above that the arrangements described are applicable to the computer and data processing industries and image retrieval systems in particular.

The foregoing describes only some embodiments of the present invention, and modifications and/or changes can be made thereto without departing from the scope and spirit of the invention, the embodiments being illustrative and not restrictive.

We claim:

1. A method of retrieving an image for display, the image being stored in a compressed wavelet-based format having blocks encoded substantially independently, said method comprising the steps of:
   (a) providing a representation of the image at a first resolution;
   (b) identifying a selected portion of the representation for reproduction at a second resolution, the second resolution being a resolution higher than the first resolution;
   (c) identifying a first set of the blocks at the second resolution, the first set of blocks corresponding to the selected portion;
   (d) retrieving, decompressing and rendering the first set of blocks to display;
   (e) identifying a second set of blocks at the second resolution, the second set of blocks being spatially adjacent to the first set of blocks;
   (f) retrieving and decompressing the second set of blocks; and
   (g) re-rendering the decompressed first set of blocks using the decompressed second set of blocks to thereby display the selected portion at the second resolution.

2. A method according to claim 1, wherein steps (d) and (e) occur substantially simultaneously.

3. A method according to claim 1, wherein step (d) further comprises, for peripheral pixels in the first set of blocks for which high frequency components required for representation at the second resolution are unavailable, setting the high frequency components to a predetermined value and rendering those pixels at an intermediate resolution between the first resolution and the second resolution.

4. A method according to claim 3, wherein the predetermined value is zero.

5. A method according to claim 3, wherein step (g) further comprises modifying the peripheral pixels.

6. A method according to claim 1 wherein step (e) further comprises identifying the blocks that surround the first set of blocks.

7. A method according to claim 1, wherein step (e) comprises identifying those said blocks, not members of said first set, that influence a reproduction of the first set of blocks at the second resolution.

8. A method according to claim 1, wherein step (e) further comprises determining a priority order within the second set of blocks and step (f) further comprises retrieving the second set of blocks in the priority order.

9. A method according to claim 8, wherein the second set is divided into sub-sets according to the priority order and the sub-sets are retrieved in the priority order.

10. A method according to claim 9, wherein a retrieval of each set or sub-set is associated with a corresponding request for blocks within the set or sub-set.

11. A method according to claim 1, wherein the retrieval of the blocks occurs over a computer network.

12. A computer readable medium comprising a computer program for retrieving an image for display, the image being stored in a compressed wavelet-based format having blocks encoded substantially independently, said program comprising:
  code for providing a representation of the image at a first resolution;
  code for identifying a selected portion of the representation for reproduction at a second resolution, the second resolution being a resolution higher than the first resolution;
  code for identifying a first set of the blocks at the second resolution, the first set of blocks corresponding to the selected portion;
  code for retrieving, decompressing and rendering the first set of blocks to display;
  code for identifying a second set of blocks at the second resolution, the second set of blocks being spatially adjacent to the first set of blocks;
  code for retrieving and decompressing the second set of blocks; and
  code for re-rendering the decompressed first set of blocks using the decompressed second set of blocks to thereby display the selected portion at the second resolution.

13. A computer readable medium comprising a computer program for retrieving an image for display, the image being stored in a compressed wavelet-based format having blocks encoded substantially independently, said program being operable upon a client computer and comprising:
  code for providing a representation of the image at a first resolution;
  code for identifying a selected portion of the representation for reproduction at a second resolution, the second resolution being a resolution higher than the first resolution;
  code for identifying a first set of the blocks at the second resolution, the first set of blocks corresponding to the selected portion;
  code for transmitting an identification of the first set of blocks to a source of the image;
  code for receiving from the source blocks of image data corresponding to the first set of blocks and for decompressing the received blocks and rendering the decompressed received blocks to display at the second resolution;
  code for identifying a second set of blocks at the second resolution, the second set of blocks being spatially adjacent to the first set of blocks;
  code for transmitting an identification of the second set of blocks to the source;
  code for receiving from the source further blocks of image data corresponding to the second set of blocks; and
  code for re-rendering the first decompressed set of blocks using a decompression of the further blocks to thereby display the selected portion at the second resolution.

14. A computer readable medium according to claim 13, further comprising:
  code for determining a priority order of the second set of blocks and for transmitting the identification in the priority order.

15. A computer readable medium according to claim 13, further comprising:
  code for requesting delivery of a remainder of blocks of the image at the second resolution.

16. A computer readable medium comprising a computer program for delivering an image for display, the image being stored in a compressed wavelet-based format having blocks encoded substantially independently, said program being operable upon a server computer at which the image is stored and comprising:
  code for supplying to a client computer a representation of the image at a first resolution;
  code for first receiving from the client computer an identification of a first set of blocks in the first resolution of the image;
  code for determining from the identification of the first set of blocks, corresponding blocks of the stored image at a second resolution, the second resolution being a resolution higher than the first resolution;
  code for first transmitting the corresponding blocks to the client computer;
  code for second receiving from the client computer an identification of the second set of blocks, the second set of blocks being spatially adjacent to the first set of blocks in the first resolution of the image;
  code for determining from the identification of the second set of blocks, corresponding further blocks of the stored image at a second resolution; and
  code for second transmitting the corresponding further blocks to the client computer, the corresponding further blocks being adapted to be used to re-render the corresponding blocks to thereby display a selected portion of the image at the second resolution, said code for second receiving being operable during operation of the code for first transmitting, said code for second transmitting being operable on conclusion of operation of the code for first transmitting.

17. A computer readable medium according to claim 16, further comprising:
  code for transmitting to the client computer a remainder of blocks of the image at the second resolution.

18. Apparatus for retrieving an image for display, the image being stored in a compressed wavelet-based format having blocks encoded substantially independently, said apparatus comprising:
  a representation unit, adapted to represent the image at a first resolution;
  a first identification unit, adapted to identify a selected portion of the representation for reproduction at a second resolution, the second resolution being a resolution higher than the first resolution;

a second identification unit, adapted to identify a first set of the blocks at the second resolution, the first set of blocks corresponding to the selected portion;

a first retrieval unit, adapted to retrieve, decompress and render the first set of blocks to display;

a third identification unit, adapted to identify a second set of blocks, the second set of blocks being spatially adjacent to the first set of blocks, at the second resolution;

a second retrieval unit, adapted to retrieve and decompress the second set of blocks; and a modification unit, adapted to re-render the decompressed first set of blocks using the decompressed second set of blocks to thereby display the selected portion at the second resolution.

19. A system for transmitting a digital image over a communication network, said system comprising:

(a) an image storage device for storing a digital image in a compressed wavelet-based format having blocks encoded substantially independently and having a plurality of resolutions;

(b) a client computer coupled to the communication network, wherein said client computer generates at least one request for interaction with the stored digital image, the one interactive request identifying a portion of the stored image, reproduced at a first resolution by said client computer pursuant to a previous request, for reproduction at a second resolution, the second resolution being a resolution higher than the first resolution;

(c) a server computer coupled to the communication network and said storage device, said server computer performing the steps of:

(i) supplying the stored image at the first resolution to said client computer in response to the previous request;

(ii) for each interactive request received from said client computer:

(A)(1) identifying a first set of blocks at the second resolution corresponding to the identified portion at the first resolution;

(2) transmitting the first set of blocks to said client computer via the communication network; and (B)(1) identifying a second set of blocks at the second resolution spatially adjacent to the first set of blocks;

(2) transmitting the second set of blocks to said client computer via the communication network, such that on receipt of the transmission of step (A)(2), the client computer decompresses and renders the first set of blocks to display, and upon subsequent receipt of the transmission of step (B)(2), the client computer decompresses the second set of blocks and re-renders the decompressed first set of blocks using the decompressed second set of blocks to display the identified portion at the second resolution.

* * * * *

UNITED STATES PATENT AND TRADEMARK OFFICE
CERTIFICATE OF CORRECTION

| | | |
|---|---|---|
| PATENT NO. | : 7,212,678 B2 | |
| APPLICATION NO. | : 09/983560 | |
| DATED | : May 1, 2007 | |
| INVENTOR(S) | : Craig Matthew Brown et al. | |

It is certified that error appears in the above-identified patent and that said Letters Patent is hereby corrected as shown below:

TITLE PAGE [56] REFERENCES CITED

Foreign Patent Documents, "EP 0859335 A2 8/1998" should be deleted.

COLUMN 2

Line 4, "Wavelet based" should read --Wavelet-based--.
Line 31, "image" should read --image of--;
Line 33, "image" should read --image;--; and

COLUMN 3

Line 3, "JPEG 2000" should read --JPEG 2000.--;
Line 5, "subject" should read --subjected--; and
Line 59, "of the" should be deleted.

COLUMN 4

Line 24, "level . . . ." should read --level.--.

COLUMN 5

Line 64, "sub functions" should read --sub-functions--.

COLUMN 6

Line 18, "view" should read --view of the--.

COLUMN 7

Line 25, "a the" should read --the--; and
Line 58, "computer module 706" should read --computer module 701--.

UNITED STATES PATENT AND TRADEMARK OFFICE
CERTIFICATE OF CORRECTION

PATENT NO.        : 7,212,678 B2
APPLICATION NO.   : 09/983560
DATED             : May 1, 2007
INVENTOR(S)       : Craig Matthew Brown et al.

It is certified that error appears in the above-identified patent and that said Letters Patent is hereby corrected as shown below:

<u>COLUMN 8</u>

Line 14, "he" should read --the--; and
Line 27, "step 712," should read --step 912,--.

<u>COLUMN 9</u>

Line 13, "scribes" should read --scribe--;
Line 32, "to" should read --into--; and
Line 63, "terms" should read --terms of--.

<u>COLUMN 11</u>

Line 7, "claim 1" should read --claim 1,--.

Signed and Sealed this

Twenty-fourth Day of November, 2009

David J. Kappos
*Director of the United States Patent and Trademark Office*